J. SPADAFORA.
RESILIENT TIRE.
APPLICATION FILED MAY 10, 1919.

1,341,391. Patented May 25, 1920.

Inventor.
Joseph Spadafora
by Heard Smith & Tennant.
Attys.

UNITED STATES PATENT OFFICE.

JOSEPH SPADAFORA, OF CAMBRIDGE, MASSACHUSETTS.

RESILIENT TIRE.

1,341,391.   Specification of Letters Patent.   Patented May 25, 1920.

Application filed May 10, 1919. Serial No. 296,171.

*To all whom it may concern:*

Be it known that I, JOSEPH SPADAFORA, a subject of the King of Italy, residing at Cambridge, county of Middlesex, State of Massachusetts, and whose post-office address is 414 Walden street, Cambridge, Massachusetts, have invented an Improvement in Resilient Tires, of which the following description, in connection with the accompanying drawing, is a specification, like characters on the drawing representing like parts.

This invention relates to resilient tires and has for its object to provide a novel resilient tire which has the various features hereinafter set forth.

In order to give an understanding of my invention, I have illustrated in the drawings a selected embodiment thereof which will now be described, after which the novel features will be pointed out in the appended claims.

Figure 1:
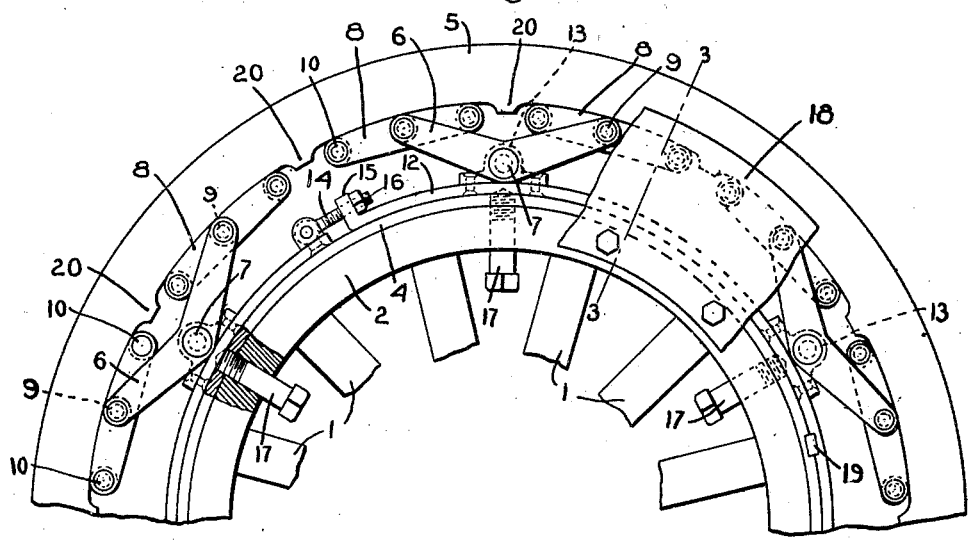
Figure 1 is a partial view of a wheel with a part broken out showing one embodiment of my invention.
Figure 2:
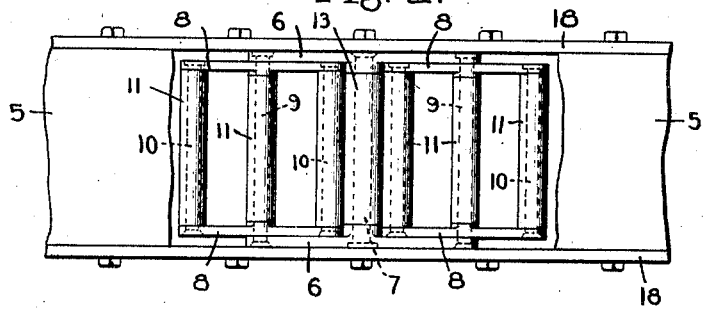
Fig. 2 is a plan view of Fig. 1 with a part broken out.

1 indicates the body of a wheel and 2 the usual felly which is encircled by a metal band 4. My invention comprises an annular resilient tread member which surrounds the wheel body and novel flexible compensating devices interposed between the tread member and the wheel body and which permit the tread member to yield but maintain it under proper tension. The tread member is shown at 5 and may be made of rubber or any other suitable flexible material.

The improved compensating devices comprise a plurality of rocking members 6 which are pivoted to the wheel body intermediate of their ends, as shown at 7, and which carry at each end a supporting member 8 that bears against the inner side of the tread member 5 and has a pivotal connection with the rocking member so that the required flexibility is provided. Each rocking member 6 is shown as having two side arms situated at the sides of the tire which are connected at their ends by pins 9 on which the supporting members 8 are pivotally mounted, said supporting members being received between the side arms of the rocking member 6. The supporting members 8 are skeleton in shape, each comprising two side plates or members connected by pins or rods 10, and if desired rolls 11 may be freely mounted on the pins or rods 10. I may, however, prefer to make one roll at least of each supporting member 8 rigid with the pin, while the other rolls are permitted to turn freely on their supporting pins. These rocking members 6 are herein shown as pivotally mounted on a demountable rim member 12 which is detachably applied to the wheel body. As herein shown, this demountable rim member 12 is provided with bosses or bearings 13 to which the rocking members 6 are pivotally connected, the two side members of each rocking member having a pivotal pin 7 that extends through the boss or bearing 13. The demountable rim 12 is shown as a split ring, it having its ends connected by the adjusting screw 14 which is pivoted to one end and extends through a lug 15 on the other end and has a clamping nut 16 applied thereto.

It is desirable, of course, that the tread member 5 should be maintained under proper tension at all times and to provide for this I have employed a construction by which the demountable rim 12 may be expanded thereby forcing the rocking members 6 outwardly against the tread member 5 to an extent sufficient to put said tread member under the desired tension. This is accomplished herein by a plurality of bolts or screws 17 which are screw-threaded through the felly 2 and rim 4 and rest in recesses formed in the inner face of the rim 12. By loosening the clamping nut 16 and then turning up the adjusting screws 17, the rim 12 can be expanded to place the tread 5 under the desired tension. After the proper adjustment has been reached, the clamping nut 16 will be tightened so as to firmly hold the rim 12 in place.

The tread member 5 is retained between side plates 18 which are attached to the felly 2 and which overlie and protect the rocking members 6.

Figure 3:
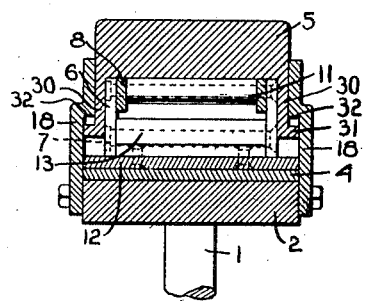
Fig. 3 is a transverse sectional view showing a different embodiment of my invention.

In Fig. 3 I have shown a form of the invention in which the tread member 5 is provided with inwardly-directed flanges 30 each of which has an an outwardly-extending lip 31 at its inner edge, and in which the side plates 18 are provided with shoulders 32 which coöperate with said lips to retain the tread member in proper position.

19 indicates a key which is set into recesses formed in the band 4 and rim 12, respectively, and which prevents any tendency of the rim 12 to creep.

When the wheel is in use and is rolling over the ground, the portion of the tread member 5 which contacts with the ground will naturally tend to move toward the center of the wheel and this will cause a rocking movement of the frames 8 and also of the rocking members 6 as they pass underneath the wheels, such rocking movement permitting the resilient action of the tread member 5. At the same time when one end of any member 6 is moved toward the center of the wheel, the other end may be moved outwardly so that the tread member 5 will be always maintained under the proper tension, notwithstanding the yielding action of that portion thereof which rests on the ground.

I have shown the tread member 5 as having projections 20 on its inner face situated between the supporting members 8, the purpose of said projections being to prevent creeping movement of the tread member.

I claim:

1. In a wheel having a resilient tire, the combination with a wheel body, of a resilient tread member encircling said body and spaced therefrom, a plurality of rocking members situated exterior to the body and pivotally supported intermediate of their ends, and a supporting member pivoted intermediate of its ends directly to each end of each rocking member and loosely bearing against and supporting the tread member.

2. In a wheel having a resilient tire, the combination with a wheel body, of a demountable rim applied thereto, a plurality of rocking members pivoted intermediate their ends to the exterior of said rim, a supporting member pivoted intermediate of its ends directly to each end of each rocking member, and a resilient tread member encircling the supporting members and bearing thereagainst, said rim, rocking members and supporting members being removable as a unit from the wheel body.

3. In a wheel having a resilient tire, the combination with a wheel body, of a split rim applied thereto, means for expanding said rim, a plurality of rocking members pivoted to the rim intermediate their ends and situated entirely exterior to the rim, supporting members pivoted to the ends of the rocking members, and a resilient tread member encircling and bearing against the supporting members, said split rim, rocking members and supporting members being removable as a unit from the wheel body.

In testimony whereof I have signed my name to this specification.

JOSEPH SPADAFORA.